June 1, 1954     O. J. POUPITCH     2,679,880
COUPLED NUT AND LOCK WASHER
Filed July 22, 1949
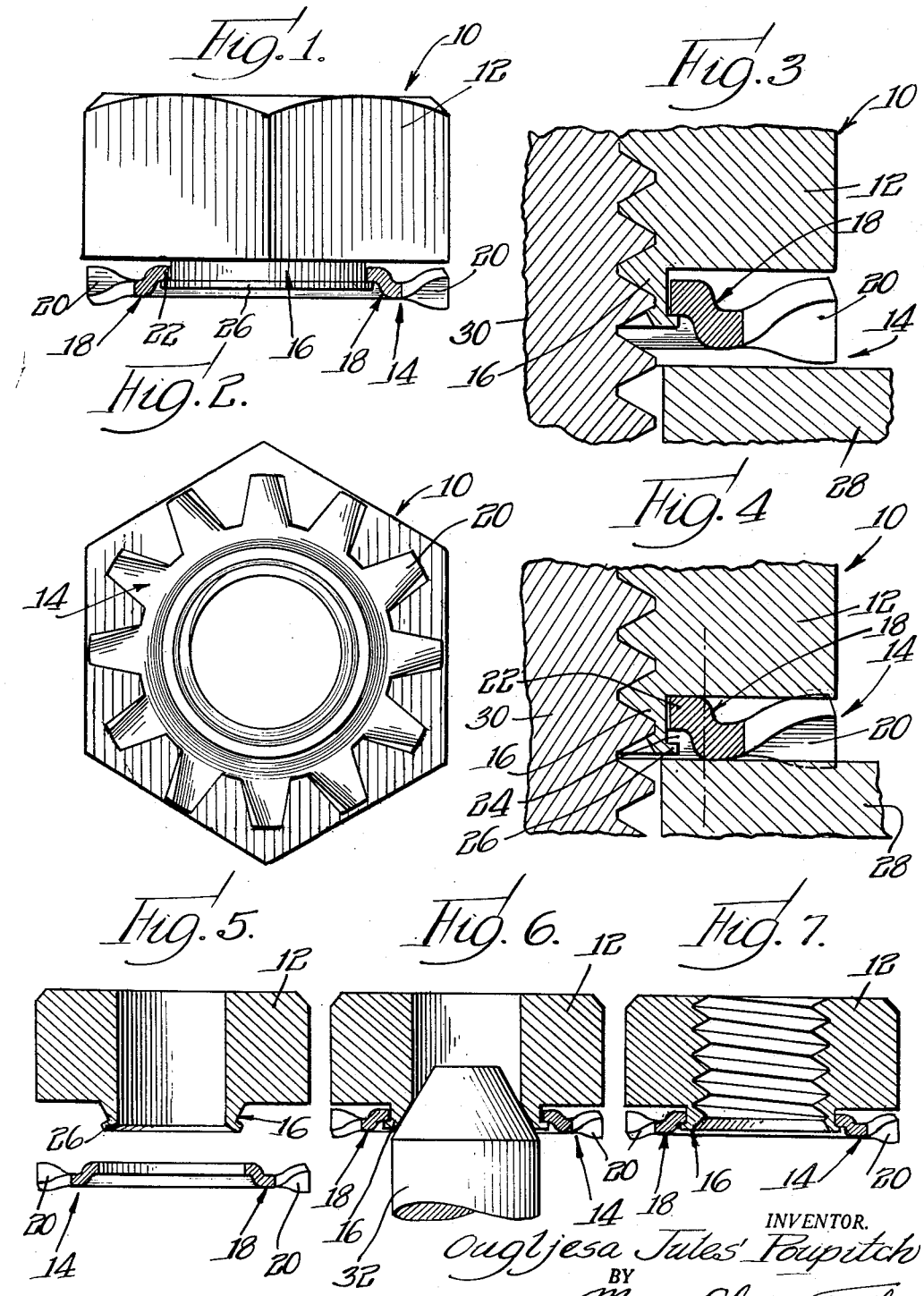
INVENTOR.
Ougljesa Jules Poupitch
BY
Moore, Olson & Trexler
attys.

Patented June 1, 1954

2,679,880

UNITED STATES PATENT OFFICE 2,679,880

COUPLED NUT AND LOCK WASHER

Ougljesa Jules Poupitch, Chicago, Ill., assignor to Illinois Tool Works, Chicago, Ill., a corporation of Illinois Application July 22, 1949, Serial No. 106,254

3 Claims. (Cl. 151—37)

This invention relates generally to fastener units, but more particularly to fastener units in the form of preassembled nuts and lock washers.

I have discovered that in instances where it is desirable to assemble a washer member on the clamping face of a nut equipped with an annular protuberance or stub shaft extending axially beyond the clamping face thereof, the connection between the washer and nut must be such as to not interfere with the proper functioning of the lock washer teeth. For example, unless the connection or coupling between the inner margin of a toothed lock washer and the complementary stub shaft of the nut is designed to permit normal functioning of the lock washer teeth, the resulting product is of no commercial significance. It is therefore an important object of the present invention to provide a fastener unit for nut and lock washer assembly, in which outer marginal locking teeth of the washer are retained in proper locking relation so that they will function with maximum efficiency when tightened against a work surface. To this end the present invention contemplates a structure consisting of an inner washer body which is displaced axially to provide a projection extending radially inwardly so as to overlie a flange or projection on the outer end of the axial protuberance of the nut.

More specifically it is an object of the present invention to provide a fastener unit of the type referred to above, wherein the laterally displaced inner margin of the sheet metal washer body and the outwardly flanged protuberance extending beyond the clamping surface of the nut cooperate to insure rotatability and limited axial movement of the lock washer with respect to the clamping surface of the nut.

It is a further object to provide a preassembled nut and lock washer unit wherein the aforesaid laterally displaced inner margin of the lock washer body not only provides an attachment portion cooperating with the flange on the protuberance in preventing axial separation, but also a rigid thickened washer rim which will limit the extent to which the clamping surface of the nut may be moved toward a complementary work surface. This latter construction is of particular significance in instances where it is desirable to prevent complete flattening of washer teeth.

The foregoing and other objects and advantages will be more apparent from the following detailed description, wherein—

Fig. 1 is a side elevational view of a preassembled nut and lock washer which is representative of one embodiment of the invention, the lock washer being disclosed in section for the purpose of more clearly illustrating the structure of the connection between the inner margin of the washer and the annular protuberance or stub shaft of the nut;

Fig. 2 is a view of the underside of the device shown in Fig. 1;

Fig. 3 is an enlarged fragmentary vertical sectional view of the lower right hand portion of the device of Fig. 1 applied to a screw, said view showing the disposition of the lock washer, nut and work surface prior to the final tightening of the fastener unit;

Fig. 4 is a fragmentary sectional view similar to Fig. 3 showing the fastener unit tightened against the work surface; and Figs. 5–7, inclusive, illustrate steps in the method of assembling the lock washer to the axial protuberance, Fig. 5 disclosing the parts in section just prior to the initial telescopic assembly of the washer to the axial protuberance, Fig. 6 disclosing the parts in preassembled relation after a tool has been applied against the inner margin of the axial protuberance to cause the flange thereof to underlie the inner laterally displaced annular body of the washer, and Fig. 7 disclosing a central sectional view disclosing the unit of Fig. 6 after the central aperture thereof has been tapped.

Referring now to the drawing more in detail wherein like numerals have been employed to designate similar parts throughout the various figures, it will be seen that one embodiment of the invention is represented by a fastener unit designated generally by the numeral 10. This fastener unit includes a nut member 12 and a lock washer designated generally by the numeral 14. The clamping side of the nut 12 is provided with an axial protuberance or stub shaft 16 for telescopically accommodating the lock washer 14.

Particular attention is directed to the structure of the annular lock washer body 18, which along its outer margin carries a plurality of prongs 20 which are deflected or twisted so as to present locking teeth projecting beyond both sides of the median plane of the roots of said prongs. The opposite margin of the washer body 18 is displaced axially and radially inwardly so as to provide an annular lip or attaching portion 22. The aforesaid lateral displacement of the inner margin of the annular washer body also serves to provide an annular recess or area 24 for accommodating a flange 26 extending radially outwardly from the extremity of the stub shaft or annular protuberance 16.

It will also be noted that because of the substantially S-shaped cross-section of the body 18, the overall thickness of said body is slightly greater than the axial extent of the annular protuberance 16. This can best be observed from the tightened position of the nut and lock washer in Fig. 4. In this figure the teeth of the washer prongs projecting beyond one side of the prong roots engage the clamping face of the nut and the teeth projecting beyond the opposite side of the prong roots lockingly engage the complementary surface of a work piece 28. In this position the washer body provides a rigid abutment so that clamping forces acting along the dot and dash line shown in Fig. 4 are resisted by an axially extending strut. While the washer body thus functions to prevent further movement of the clamping surface of the nut toward the work surface, the washer teeth will have firmly embedded themselves. In this manner the washer teeth are prevented from being completely flattened regardless of the clamping force exerted by the nut as it is rotated in a tightening direction upon the screw member 30.

Prior to the tightening of the fastener unit against a work surface, the washer is freely rotatable and movable axially to a limited extent on the protuberance 16. That is to say, the protuberance 16 and the laterally displaced margin of the washer body present cooperating bearing surfaces which maintain the concentricity of the parts at all times, permit relative rotation, and also permit limited axial movement essential to the proper functioning of the lock washer teeth. As the fastener unit is tightened against the work surface, the oppositely projecting teeth of the lock washer engage the clamping surface of the nut and the work surface. Upon continued rotation relative axial movement between the parts continues until the teeth have become firmly embedded and the washer body is firmly clamped in position, as illustrated in Fig. 4. By providing the annular recess or area 24 for accommodating the flange 26, it is possible to maintain the axial length of the annular protuberance or stub shaft 16 less than the overall thickness of the washer body. This prevents any interference of the free end of the stub shaft with the work surface, and thus enables the teeth of the lock washer to function normally.

In Figs. 5 to 7, inclusive, one method of assembly has been disclosed. In the disclosed method the protuberance or neck 16 is first formed, as shown in Fig. 5. It is to be noted as shown in Fig. 5 that the protuberance or neck 16 is initially frusto-conical and the flange 26 is normal to the frusto-conical or tapered surface. In this position the external diameter of the flange 26 is less than the washer aperture and permits telescopic preassembly of the washer body with the neck. Following this initial preassembly, a suitable tool 32 is moved axially into engagement with the inner margin of the neck 16 adjacent the flange 26, thereby causing the flange to be moved radially outwardly into overlapping relation with the inner lip 22 of the washer body 16. The tool 32 causes not only the flange 26 to be moved outwardly but also causes the protuberance or neck 16 to be moved radially outwardly and assume a substantially cylindrical form, as shown in Fig. 6. This method assures the preassembly of the lock washer and nut without binding the inner margin of the washer with the neck or stub shaft. The initial tapering of the protuberance or neck 16 and its subsequent outward pressing enables the flange 26 to be initially positioned so that the washer will clear it as it is assembled with the nut and to insure that the flange will assume a final position parallel to the plane of the washer and the clamping face of the nut. At the same time the outward pressing of the protuberance 16 and flange 26 allows the thin section of the protuberance or neck to be moved out of the way of the threading tap so that it will not be cut and hence weakened by the tapping operation. The size of the flange 26 is predetermined because it is formed prior to the lateral displacement thereof. Hence, the flange may be designed to accurately fit the annular area 24 provided by the laterally displaced washer body. Also, the axial distance between the flange and the clamping surface of the nut is accurately determined so as to insure the required limited axial movement of the lock washer along the cylindrical periphery of the neck or stub shaft 16. By employing a cylindrical periphery, concentricity of the washer member is maintained at all times.

By laterally displacing the annular washer body, an annular lip or attachment portion is not only provided, but also the washer prongs are enabled to be moved radially inwardly so as to position them under the clamping surface of the nut. That is to say, if the entire body portion of the washer were to extend normal to the washer axis, the prongs would necessarily project radially outwardly a greater distance. This is of importance in instances where it is desirable to position the locking teeth in that circumferential area defined by the clamping surface of the nut.

The invention is hereby claimed as follows:

1. A fastener unit comprising a rotary threaded fastener member having a radially extending clamping face, and a sheet material lock washer, said fastener member having annular protuberance means projecting generally axially from said clamping face and terminating in generally radially extending flange means, said sheet material lock washer including a generally radially extending inner annular marginal portion encircling said annular protuberance means and overlying said flange means for retaining the washer and fastener member in assembled relationship, said lock washer also including an annular portion joined at one end to said inner annular marginal portion and extending abruptly and generally axially away from the clamping face and having an axial length substantially greater than the thickness of the sheet material of the lock washer and greater than the axial extent of said annular protuberance means thereby providing a relatively rigid annular abutment, and flexible locking teeth integral with and extending radially outwardly from said last mentioned washer portion and projecting axially beyond said washer portions in opposite directions, said abutment serving to restrain complete collapsing of the washer teeth.

2. A fastener unit, as defined in claim 1, wherein said rotary fastener member comprises a nut having a central threaded bore, and wherein said annular protuberance means project from said clamping face adjacent said bore.

3. A fastener unit comprising a rotary threaded fastener member having a radially extending clamping face, and a sheet material lock washer, said rotary fastener member including an annular protuberance projecting generally axially from said clamping face and terminating in generally radially extending flange means, said sheet material lock washer having inner and outer axially offset generally radially extending annular marginal portions integrally joined by an annular portion extending substantially axially away from the clamping face, said axially extending portion having an axial length greater than the thickness of the sheet material of the washer and greater than the axial extent of said annular protuberance for providing a relatively rigid abutment, and flexible locking teeth extending radially outwardly from said outer marginal portion and projecting axially beyond said washer portions in opposite directions, said inner washer marginal portion being disposed around said protuberance and overlying said flange means for retaining the washer and fastener member in assembled relationship, and said abutment serving to restrain complete collapsing of the washer teeth.

References Cited in the file of this patent

UNITED STATES PATENTS

| Number | Name | Date |
|---|---|---|
| 1,726,972 | Zinnbauer | Sept. 3, 1929 |
| 2,034,494 | Stoll | Mar. 17, 1936 |
| 2,227,464 | Olson | Jan. 7, 1941 |
| 2,270,748 | Baker | Jan. 20, 1942 |
| 2,391,279 | Tarwater et al. | Dec. 18, 1945 |
| 2,424,208 | Poupitch | July 15, 1947 |

FOREIGN PATENTS

| Number | Country | Date |
|---|---|---|
| 779,361 | France | Apr. 3, 1935 |